Feb. 7, 1956  A. P. CAPITANI  2,733,474
PAINT PROTECTIVE DEVICE FOR MOTOR VEHICLES
Filed Dec. 27, 1950  2 Sheets-Sheet 1
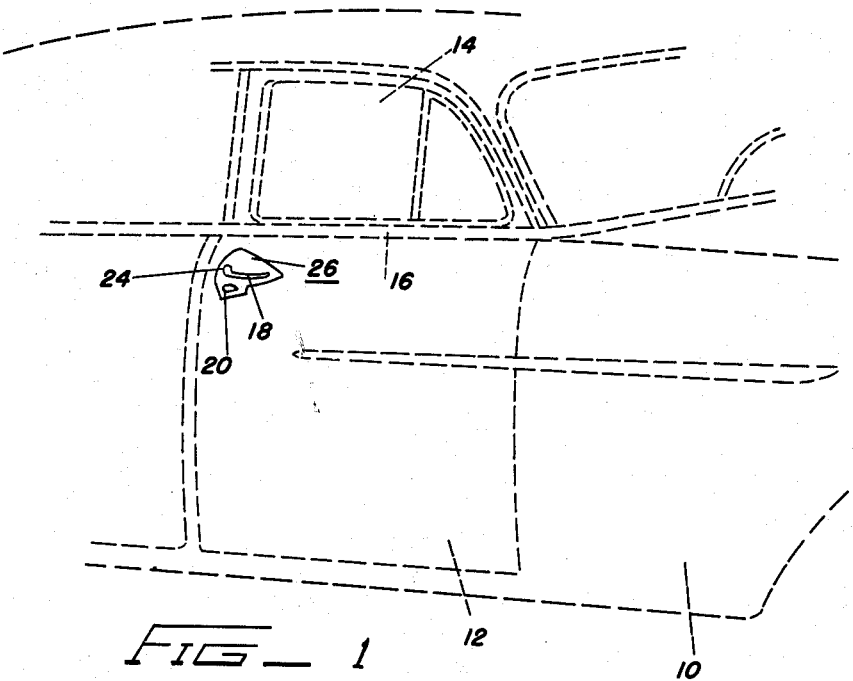
FIG. 1
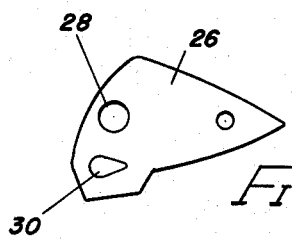
FIG. 2
FIG. 9
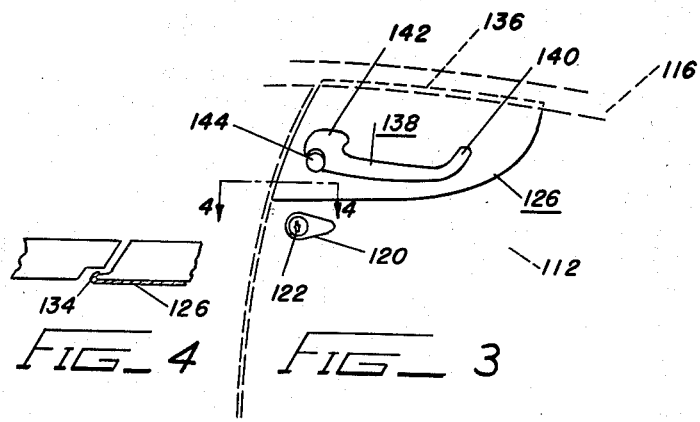
FIG. 4  FIG. 3
INVENTOR.
ARNOLD P. CAPITANI
BY
A. E. Wilson
ATTORNEY

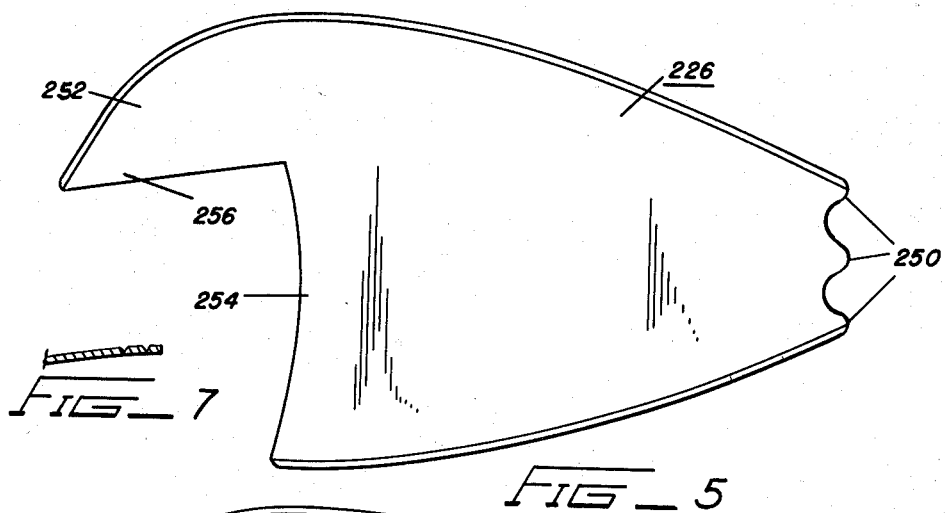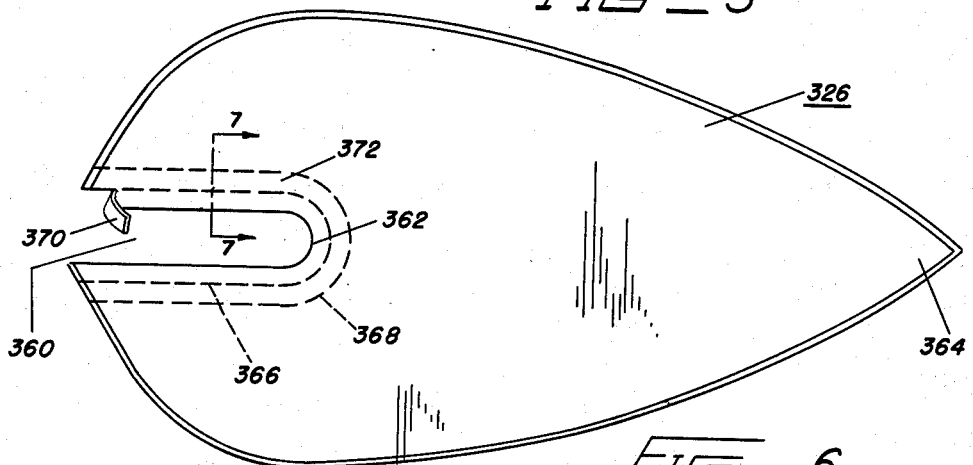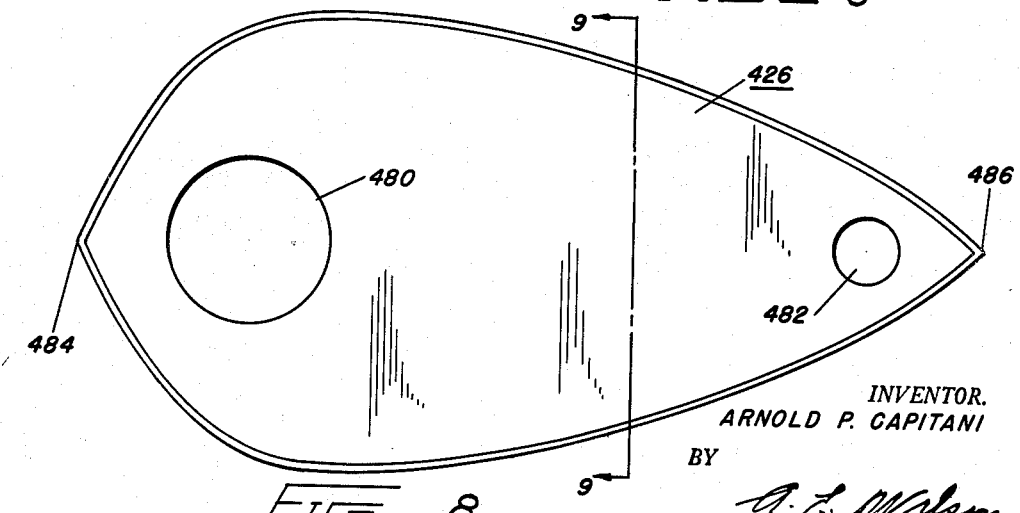

United States Patent Office 2,733,474
Patented Feb. 7, 1956

2,733,474

PAINT PROTECTIVE DEVICE FOR MOTOR VEHICLES

Arnold P. Capitani, Detroit, Mich.

Application December 27, 1950, Serial No. 202,903

1 Claim. (Cl. 16—1)

This invention relates to surface protecting devices. More particularly the invention relates to a contoured decorative metallic plate adapted to be secured to the side of a motor vehicle in the area of the handle and key slot to protect the surface finish of the vehicle.

The painted or lacquered surface of a motor vehicle in the area of the door handle and key slot is frequently marred or scratched by the finger nails, keys and other objects. It frequently happens that colored nail polish from ladies' finger nails is smeared on the surface of the vehicle beneath or adjacent the door handle. The finger nails scratch into the painted surface of the vehicle body and the colored nail polish is thus deposited deeply into the body of the painted surface thereby impairing the beauty of the vehicle.

An object of this invention is to protect the painted surface of a vehicle adjacent the door handle or lock.

A further object of the invention resides in the provision of a decorative metallic plate adapted to be secured to a vehicle body to underlie the door handle and surround the key slot carrying member to protect the paint.

Another object of the invention is to provide a protective plate that can be readily applied to the door handle area of a motor vehicle.

Still a further object of this invention is to provide a plate contoured to conform with the shape of a vehicle body in the area of the door handle, and which is provided with a plurality of scored sections whereby it may be readily adjusted to fit various vehicle bodies.

Yet another object of the invention resides in the provision of a surface protective device that can be applied to the area of the door handle and be held in place thereon by the door handle thereby eliminating the need for screws or other fastening means.

Further objects and advantages of the invention will be apparent from the following description, taken in connection with the appended drawings, in which:

Fig. 1 is a fragmentary perspective view of a motor vehicle having my paint protective device mounted thereon.

Fig. 2 is a plan view of the protective device illustrated in Fig. 1.

Fig. 3 is a fragmentary view similar to Fig. 1 illustrating a modified form of the invention.

Fig. 4 is a fragmentary sectional view taken substantially on the line 4—4 of Fig. 3 looking in the direction of the arrows.

Figs. 5 and 6 are plan views of further modified forms of the invention.

Fig. 7 is a fragmentary sectional view taken substantially on the line 7—7 of Fig. 6 looking in the direction of the arrows.

Fig. 8 is a plan view of a still further modified form of the invention.

Fig. 9 is a sectional view taken substantially on the line 9—9 of Fig. 8, looking in the direction of the arrows.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to the embodiment of the invention illustrated in Figs. 1 and 2, it will be observed that a motor vehicle body 10 is provided with a door 12 having a window opening 14 positioned above a belt molding 16. The door is provided with a handle 18 whereby it may be opened to gain access into the interior of the vehicle body. A projection 20 having a key receiving slot 22 is positioned beneath the handle 18.

To open the door 12 to gain access to the interior of the vehicle body 10, the handle 18 is grasped and actuated by twisting it in the clockwise direction as viewed in Fig. 1 to release the catch and permit the door to swing open on its hinges. When people reach for or grasp the handle 18 they frequently reach too far, and the pointed ends of their finger nails scrape against the painted surface of the door positioned beneath the door handle. This painted surface thus becomes scratched and discolored particularly when contacted by colored nail polish. The paint in the area of the handle 18 is also frequently scratched when drivers of the vehicle attempting to locate the key receiving slot 22 in the projection 20 scrape the end of the key against the painted surface adjacent the projection 20 and handle 18.

The handle 18 illustrated in Fig. 1 is of the type having a shank 24 extending substantially perpendicularly to the surface of the door to actuate the unlatching mechanism and release the door to permit it to be opened. A protective plate 26 shaped to conform generally with the contour of the vehicle body is adapted to be secured to the body beneath the handle 18 and surround the projection 20.

The protective plate 26 may be formed of any suitable material such as plastic, brass, aluminum or steel, and may be chrome plated or may embody any desired ornamentation.

As illustrated in Fig. 2 the protective plate 26 is provided with a plurality of apertures 28 and 30 to receive the shank 24 of the handle 18 and the projection 20 having the key receiving slot therein. To apply the protective plate 26 the handle 18 is released by removing the screw fastener projecting into the inner surface of the shank 24 from a portion of the door which is concealed when the door is closed, as the edge or inner surface of the door. The handle 18 is removed from the door by withdrawing the shank 24 through its receiving aperture in the door. The protective plate 26 is then positioned in place with the aperture 28 aligned with the aperture which receives the shank 24 of the handle 18, and with the aperture 30 receiving the projection 20 having the key slot therein. The handle 18 is then replaced, the shank 24 projecting through the aperture 28. The bead or flange carried by the shank 24 contacts the outer surface of the plate 26 and holds the protective plate in place thereon.

The embodiments of the invention illustrated in Figs. 3, 5, 6 and 8 are similar in many respects to that illustrated in Figs. 1 and 2. Corresponding parts have therefore been given corresponding reference numerals with the addition of 100.

In the embodiment of the invention illustrated in Figs. 3 and 4 the protective shield 126 has a bent over edge 134 adapted to hook over and engage the rear vertical edge of the door 112 as illustrated in Fig. 4. The upper edge of the shield 126 illustrated in dotted lines at 136 projects beneath the belt molding 116 as illustrated in Fig. 3. This embodiment of the invention is adapted for use with a handle 138 having front and rear sections 140 and 142 permanently secured to the door 112. The handle 138 has a manually actuated plunger 144 positioned in the rear section 142. The plunger 144 is operably connected to the latching mechanism in such a manner that the catch holding the door in the closed position is released when the plunger 144 is depressed. The protective shield is provided with a plurality of apertures to receive the sections 140 and 142 of the handle 138 which lock the shield in place.

To apply the protective shield the concealed securing means for holding the handle 138 in place is removed, and the handle is withdrawn from the door 112. The sections 140 and 142 of the handle 138 are then projected through the aforementioned apertures in the plate 126, and the handle is again inserted through the receiving apertures in the door. The securing means is replaced to hold the handle in place, and the handle locks the shield 126 in place as illustrated.

It will of course of apparent that any conventional type of securing means may be employed to hold the handle in place on the door. This may for example be in the form of a plate having enlarged apertures to receive contoured inner ends of the sections 140 and 142, and having reduced sections to engage grooves in the inner ends when the plate is shifted longitudinally to abut a flanged end with the edge of the door jamb.

The embodiment of the invention illustrated in Fig. 5 is adapted for use with vehicles having push button door handles of a type wherein resilient sealing means such as rubber is positioned around front and rear sections of a door handle. To apply the protective shield 226, the door handle is loosened at both ends, and the projections 250 at the right hand end are projected under the end of the door handle remote from the end having the door releasing catch therein. The opposite end 252 of the protective shield 226 is then twisted angularly about the end having the projections 250 thereon. The angularly related surfaces 254 and 256 slide under the protective rubber or other material surrounding the portion of the door handle having the releasing catch therein. The opposite ends of the handle are then tightened to clamp the protective shield 226 and hold it in place in protective relation to the painted surface adjacent the handle.

If it is desired to employ the protective shield 226 with a door handle of such a type that it is not convenient to release the end of the handle remote from the end having the door releasing catch the projections 250 may be pushed into the rubber or other sealing means positioned adjacent thereto. The shield 226 may then be oscillated as described above to position the edges of the plate adjacent the surfaces 254 and 256 under the sealing means associated with the end of the door handle having the releasing catch therein. The end of the door handle having the releasing catch may then be tightened to hold the shield 226 in place.

The protective shield 326 illustrated in Figs. 6 and 7 is adapted for use with door handles which are oscillated to open the door. The protective shield 326 has an elongated slot 360 adapted to receive the circular actuating portion of the handle. The inner edge 362 defining the slot 360 is adapted to slide beneath the rubber insulation or other material surrounding the handle when the actuating handle is loosened to permit installing the protective shield. After the shield is placed in the desired position the handle is again tightened to securely hold the shield in place. The shield 326 is contoured transversely to conform generally with the contour of the side of the vehicle to which the shield is to be applied.

It will be noted that the shield 326 has a contoured body portion terminating in a converging end 364, a portion of which is adapted to underlie the end of the handle remote from the pivotal connection thereof to the door of the vehicle.

The shield 326 illustrated in Figs. 6 and 7 is provided with a plurality of adjacently disposed score lines 366 and 368 to adapt the shield 326 for use with vehicles having handle actuating portions of different diameters. To adapt the shield 326 for use with a handle of a larger diameter than will slide into the slot 360 the contoured section 370 may be removed by tearing or cutting along the score line 366 thereby enlarging the width of the slot 360. If the slot is then still too small to receive the handle in question another contoured section 372 may be removed by tearing or cutting along the score line 368.

In the embodiment of the invention illustrated in Figs. 8 and 9 a protective shield 426 having two apertures 480 and 482 is provided for use with handles secured to the vehicle at both ends. This embodiment of the invention is applied to the vehicle as described in connection with the embodiment illustrated in Figs. 3 and 4. It will be noted that the shield 426 has pointed ends 484 and 486 with a well contoured body portion therebetween.

While the invention has been described with particular reference to certain specific embodiments, it will be apparent that various changes may be made without departing from the spirit of the subjoined claim.

I claim:

A shield for protecting paint in the area of a door handle of the oscillating type for a vehicle door comprising a thin decorative longitudinally tapered plate extending longitudinally of the body and being contoured transversely and longitudinally to conform generally with the contour of the vehicle door adjacent the door handle, said shield having an axially extending slot adjacent its larger end for the reception of the handle of the door and being adapted to be clamped between the sealing means associated with the handle and the associated surface of the door, the shield having a plurality of adjacently disposed substantially parallel score lines extending in substantial parallelism with said slot whereby the width of the slot may be increased to accommodate handles of varying dimensions.

References Cited in the file of this patent

UNITED STATES PATENTS

| | | |
|---|---|---|
| D. 157,116 | Adams et al. | Feb. 7, 1950 |
| 461,711 | Preston | Oct. 20, 1891 |
| 740,300 | Mosman | Sept. 29, 1903 |
| 1,383,088 | Earle | June 28, 1921 |
| 1,796,226 | Tombler | Mar. 10, 1931 |
| 1,810,510 | Winne | June 16, 1931 |
| 2,028,971 | Kemper | Jan. 14, 1936 |
| 2,489,072 | Ausubel | Nov. 22, 1949 |
| 2,557,773 | Steinman | June 19, 1951 |
| 2,636,209 | Tedder | Apr. 28, 1953 |

FOREIGN PATENTS

| | | |
|---|---|---|
| 27,118 | Great Britain | of 1908 |
| 114,461 | Great Britain | Apr. 2, 1918 |
| 547,659 | Great Britain | Sept. 4, 1942 |

OTHER REFERENCES

Upholstery Shield—Popular Science, April 1943, page 132.